P. W. CRAIG.
AUTOMATIC MECHANICAL GEAR SHIFTING MECHANISM.
APPLICATION FILED DEC. 17, 1918.

1,354,890.

Patented Oct. 5, 1920.

Inventor
P. W. Craig.

By [signature]
Attorney

P. W. CRAIG.
AUTOMATIC MECHANICAL GEAR SHIFTING MECHANISM.
APPLICATION FILED DEC. 17, 1918.

1,354,890.

Patented Oct. 5, 1920.

UNITED STATES PATENT OFFICE.

PARLEY W. CRAIG, OF ENSLEY, ALABAMA.

AUTOMATIC MECHANICAL GEAR-SHIFTING MECHANISM.

1,354,890.  Specification of Letters Patent.  Patented Oct. 5, 1920.

Application filed December 17, 1918. Serial No. 267,207.

*To all whom it may concern:*

Be it known that I, PARLEY W. CRAIG, a citizen of the United States of America, residing at Ensley, in the county of Jefferson and State of Alabama, have invented certain new and useful Improvements in Automatic Mechanical Gear-Shifting Mechanism, of which the following is a specification.

My invention relates to a gear shifting mechanism especially adapted for automobiles and all types of motor driven vehicles.

The present general practice of first disengaging the clutch by foot and then shifting the gears into the desired position by means of a lever operated by hand has been found objectionable as it has a tendency to distract attention from the steering of the car and, by necessitating the removal of one hand from the steering wheel, has occasioned many accidents. Moreover, as the operation of the gear shift lever is selective it is often changed into the wrong speed gear and as a result the gears are stripped and the transmission casing is sometimes broken. To overcome these objections, mechanical gear shifting mechanisms have been designed but their construction has been so delicate or their operation of such doubtful practical value that at the present time none are in general use.

The object of my invention is to design a gear shifting mechanism which is extremely simple in its construction, which comprises only a few parts capable of rugged structure and which possesses the distinctively novel characteristic of being both automatic and selective in its gear shifting functions. In its automatic functioning my mechanism responds to the clutch pedal and successively in each cycle, shifts the gears from low through intermediate to high speed, then to neutral and finally to reverse, each change being responsive to a full throw of the clutch pedal but being unresponsive to a normal disengaging clutch pedal operation necessary for driving conditions not requiring a change of the gears. The selective functioning of my invention, which is responsive to hand control, is necessary because the automatic sequence of gear shifting movements must be changed at times so as to skip any one or more of the changes, this being of peculiar advantage in skipping the reverse when shifting from high through neutral to intermediate or low.

Another feature of peculiar advantage of my invention is that the shifting operation takes place at the exact or critical moment when the gears will mesh with the least possible strain.

My invention comprises the various novel details of construction and arrangements of parts, which in their preferred embodiments only, are illustrated in the accompanying drawings, and in which:—

Similar reference numerals refer to similar parts throughout the drawings.

I have illustrated my mechanism as applied to an automobile 1 which is typical of any motor driven vehicle equipped with a clutch lever 2 adapted to rock on an axis 3 and by means of a crank 4 and suitable transmission elements 5 to operate the clutch 6. A gear case 7 of any suitable type is mounted under the car body and is equipped with any standard type of variable speed transmission gearing, such as is characteristic of motor driven vehicles, and my improved automatic gear shifting mechanism is contained in a casing 8 preferably attached to the gear case 7.

Figure 1:
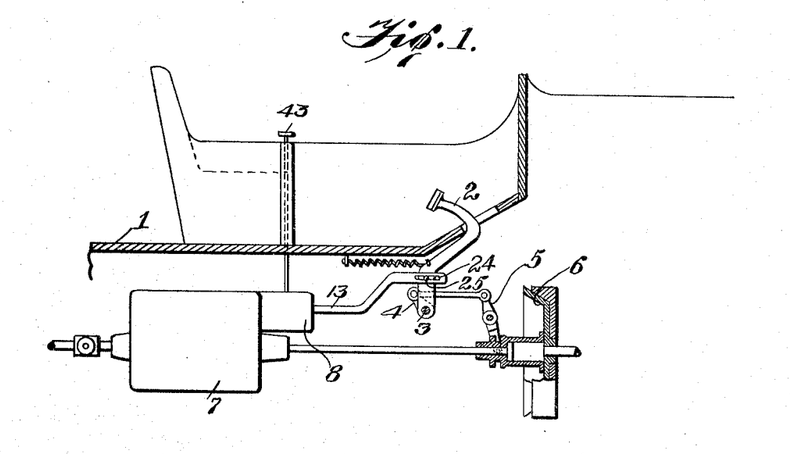
Figure 1 illustrates a typical automobile in section showing the manner of mounting the automatic gear shifting mechanism and its controlling and operating parts thereon.
Figure 2:
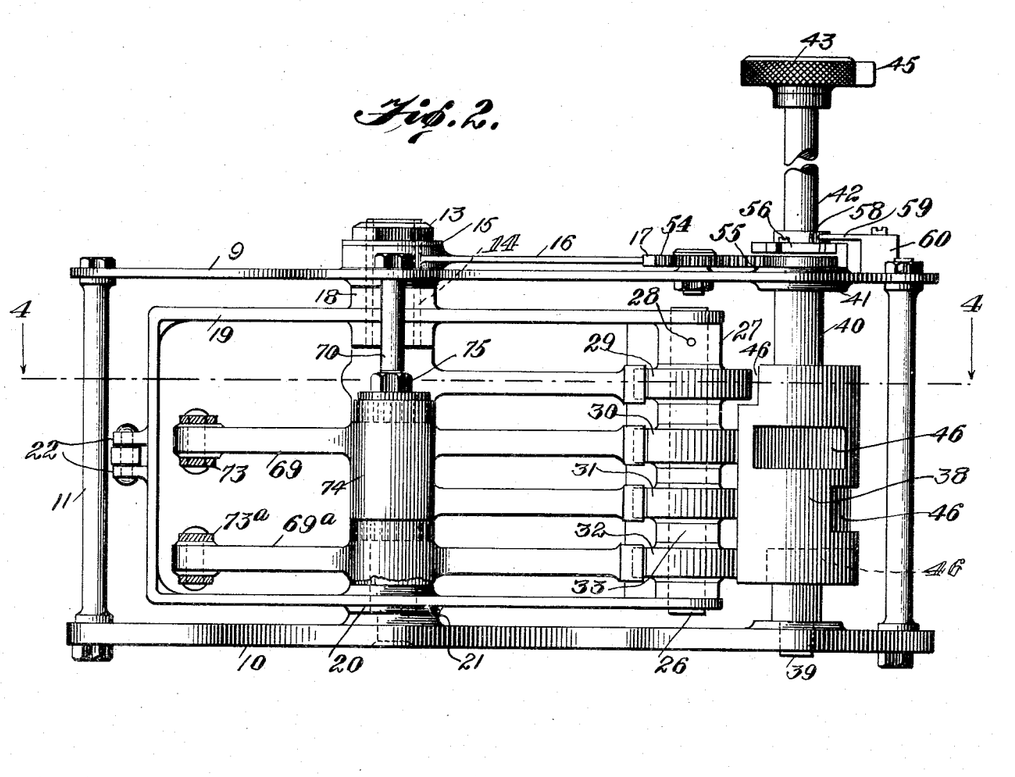
Fig. 2 is a side view of the shifting mechanism as removed from its casing.
Figures 3, 4:
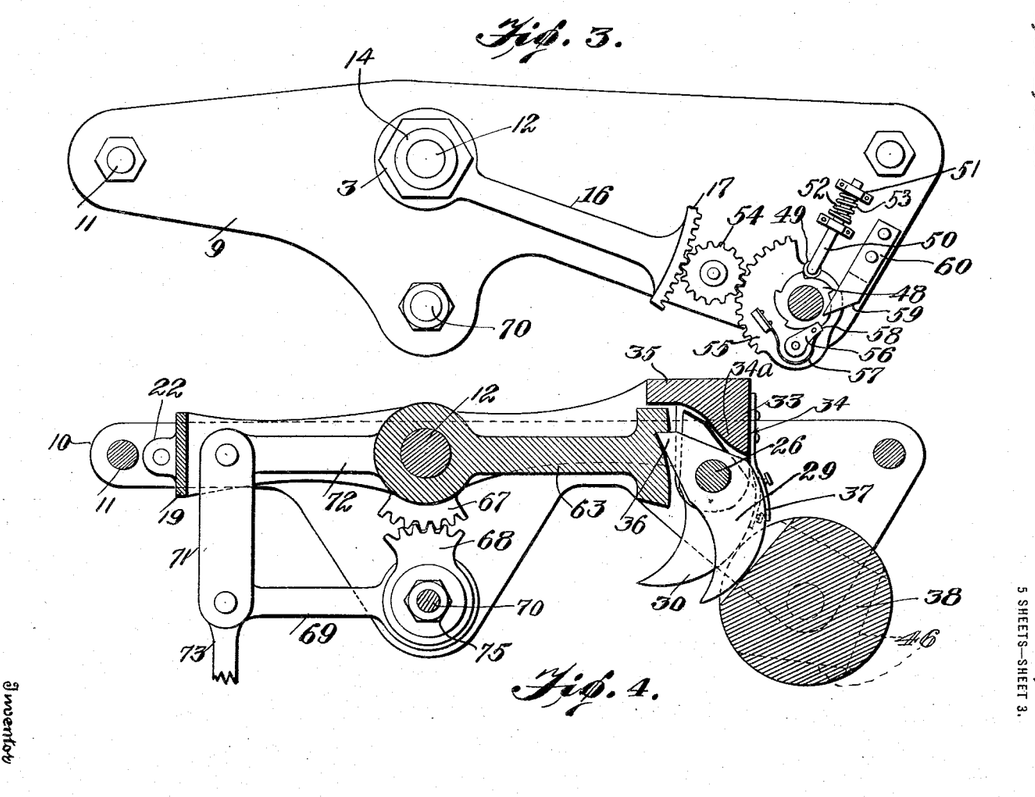
Fig. 3 is a top plan view of Fig. 2.
Fig. 4 is a sectional view taken on the line 4—4 of Fig. 2.
Figure 5:
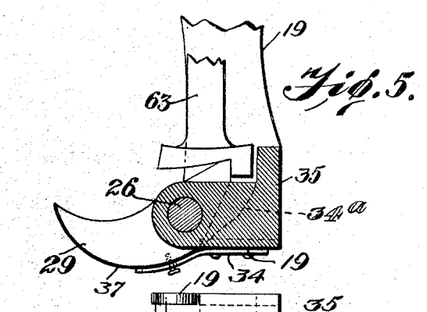
Fig. 5 is a detail view of the pawl in operating relation with its respective control lever, the view being taken on the section line 5—5 of Fig. 6 through the master lever.
Figure 6:
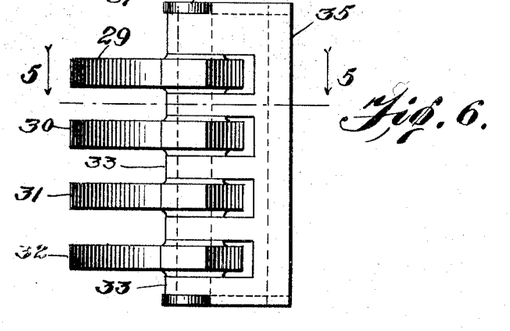
Fig. 6 is an elevation of the pawl carrying end of the master lever.

The mechanism within the gear case 8, which is illustrated more fully in Figs. 2 to 4, comprises a frame having a top plate 9 and a bottom plate 10 suitably and rigidly connected by distance bolts 11. This frame is rigidly mounted in the casing by any suitable attaching means and near its center is provided with a main vertical shaft 12, the lower end of which is riveted into the base plate 10 while its upper end projects through the top plate 9. A sleeve 14 is mounted to turn on the upper end of the shaft 12 in suitable bearings in the top frame 9 and its upper end is threaded to receive the nut 13. A rack arm 16 having an arcuate gear segment 17 on its free end is keyed to the sleeve above the plate 9. The lower end of sleeve 14 below the plate 9 is made fast in the hub 18 on the upper arm of the yoke-like master lever 19, the lower arm of which master lever is provided with a hub 20 turning on the lower end of the shaft 12 and resting on a bearing boss 21 on the bottom plate 10. The master lever is provided with perforated lugs 22 between which is pivotally connected one end of the operating rod 23 (see Fig. 1), which passes through a suitable opening in the casing 8 and has its upturned outer end provided with an elongated slot 24 in which engages a pin 25 on the clutch pedal 2. The length of the slot and the normal position of the pin 25 therein is such that the clutch pedal has enough free play to release the clutch sufficiently for ordinary driving purposes without influencing or operating the gear shifting mechanism, but when the clutch pedal is given a full throw, the pin will engage the forward end of the slot 24 and draw the rod 23 forward so as to cause the master lever 19 to swing clockwise from normal position shown in Fig. 8 to operating position shown in Fig. 4.

Figure 7:
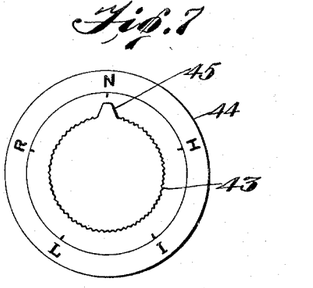
Fig. 7 is a top plan view of the hand control knob for the pawl setting cam cylinder.

In the free or open end of the yoke-like master lever 19 I mount a vertical bearing pin 26 which at its upper end is received in a socket 27 on the yoke frame and secured in position by a pin 28 passing therethrough. Mounted to turn on this pin 26 are four similar pawls 29, 30, 31 and 32. These pawls are spaced by perforated lugs 33 on the lever through which the shaft 26 passes, and each pawl is engaged by its respective spring 34 which is made fast in a vertical web 35 which connects the upper and lower members of the yoke lever and carries the lugs 33. The springs tend to hold the pawls in the position of the pawl 29 in Fig. 4, but will flex to permit the pawls to shift to the position of the pawl 30 in this figure. Each pawl comprises a rear end forming a lever engaging tooth 36 and a forward end provided with an outer convex surface 37 disposed to engage the controller cam cylinder 38 as the pawls move responsive to the oscillation of the master lever 19. The controller cylinder 38 is provided with reduced ends 39 and 40, the former being further reduced and mounted like a step bearing in the bottom frame plate 10 while the upper end 40 is reduced where it passes through the bearing boss 41 in the top plate 9 and continues there above so as to form the hand controller shaft 42 which projects upwardly with ample clearance through the body of the car seat and on its upper end carries a knurled controller knob 43. This knob works above a suitable fixed dial plate 44, shown in Fig. 7, and is provided with a pointer tip 45 which successively assumes position opposite one or the other of the five points marked thereon N, H, I, L and R, and respectively indicating the following positions of the transmission gearing, to-wit: neutral, high, intermediate, low and reverse.

The controller portion of the cylinder 38 is provided opposite each of the several pawls 29, 30, 31 and 32 with a notch 46 formed by removing a sufficiently large segmental portion of the cylinder opposite each pawl to permit the latter when its respective notch stands opposite it to shift sufficiently in response to its respective spring 34 to bring its lever engaging tooth 36 into operative position. The notches, as will be more clearly seen in Fig. 4, are distributed about the cylinder as viewed endwise so as to leave one longitudinal uninterrupted neutral zone or cam surface 47 extending the full length of the controller cylinder. The arcs subtended by the several notches are equal and jointly subtend the rest of the circumference of the cylinder not included in the zone 47. In effect the controller cylinder in making each complete rotation will advance five equal steps and with each step will present one of the notches or the neutral zone in pawl controlling position.

The step by step movement of the controller cylinder can be effected both automatically and manually, the manual advance of the cylinder being controlled by the knob 43 which will turn the shaft 42 and with it the controller cylinder 38. In order to force the cylinder to assume its successive operating positions I mount fast on the shaft 42 a ratchet wheel 48, see Fig. 3, having five equi-distantly spaced ratchet teeth thereon which are engaged on one side by a roller 49 journaled in the yoke end of a spring-pressed rod 50 which is slidably mounted in brackets 51 on the top bearing plate 9 and is provided with a collar 52 against which a coil spring 53 interposed between it and the bracket presses, and by forcing the roller against the ratchet teeth I tend to bring the shaft to rest at one or the other of its five operating positions.

The automatic mechanical means for shifting the controller cylinder comprises a gear wheel 54 mounted on the plate 9 and meshing on one side with the rack 17 and on the other with a segment 55 which is made fast to or is formed integral with the ratchet wheel 48. On this segment 55 I mount a pawl 56 which is normally pressed by a spring 57 against the ratchet wheel 48 with the result that each oscillation imparted by the clutch operated rod 22 to the master lever 19 will be transmitted through the sleeve 14 and arm 16 through the gears 17, 54 and 55 and through pawl to advance the ratchet wheel 48 one step. As the segment 55 nears the completion of its driving stroke a pin 58 on the pawl 56 will engage the cam surface 59 of the throw-out stop plate 60 attached to the top plate 9 and elevated enough to let the pawl pass beneath it but against which the pin 58 will strike causing the pawl to disengage from the ratchet 48 and remain in this position while the clutch pedal stands in "clutch engaged" position and has shifted the several parts of the mechanism accordingly. This throw-out stop thus in the engaged position of the clutch will free the ratchet wheel so that the controller cylinder may be moved backward or forward by the knob 43 and placed in any position that the operator may wish so that the next operation of the clutch pedal to release the clutch will shift the gears to that position to which the controller cylinder was set. Each full operation of the clutch pedal thus automatically gives the segmental gear 55 a full stroke and advances the ratchet wheel 48 one tooth, shifts the controller cylinder to its operating position next in order, and shifts the transmission gears to the position last indicated by the knob tip 45.

The drawings illustrate an apparatus adapted to work the standard four speed transmission such as is most generally used at present. Should it be desired to adapt the apparatus to control a transmission having more than this number of speeds it would then be necessary to increase the number of notches 46 on the controller cylinder and correspondingly increase the number of teeth on the ratchet wheel 48. Also the pawl operated control levers for effecting the gear shifts would proportionately be increased.

I illustrate four pawl operated control levers 61, 62, 63 and 64 which are correlated to work in two pairs comprising respectively the levers 61 and 62 and the levers 63 and 64. Referring now to the levers 61 and 62 it will be seen that both are mounted to turn independently on the shaft 12 and that each is provided at its free end with a pawl engaging head having a convex surface 65 terminating at one end at the base of a detent or shoulder 66. The lever 61 is provided with a segmental gear 67 meshing with a similar gear 68 on a shifting arm 69 which is mounted to turn on a shaft 70 made fast in the top and bottom frame plates 9 and 10. This arm 69 is connected by a link 71 with a rear arm 72 forming an integral extension of the lever 62. By the gearing and link connections shown it will be seen, by comparison of Figs. 8, 9 and 10, that as either lever 61 or 62 is thrown in one direction by its respective pawl 29 or 30 the other lever of the pair is moved in the opposite direction beyond its normal position shown in Fig. 8. The link 71 and the arm 68 are connected to the rod 73 which is adapted to shift the gears to high speed and second or intermediate speed positions. The levers 63 and 64 are similar respectively to the levers 61 and 62 and the arm $72^a$ of the lever 64 is connected by means of a link $71^a$ to a shifting arm $69^a$ that is connected by gears $67^a$ and $68^a$ and serves to operate a gear shift rod $73^a$ controlling the low speed and reverse shifting movements of the transmission gears. The arm 69 is provided with an elongated hub 74 (see Fig. 2), which bears on the arm $69^a$ which has a shorter hub bearing which rests on the base plate 10, the two hubs being held rotatably in position on the shaft 70 by means of a nut 75 screwed thereon.

Figures 8, 9, 10:
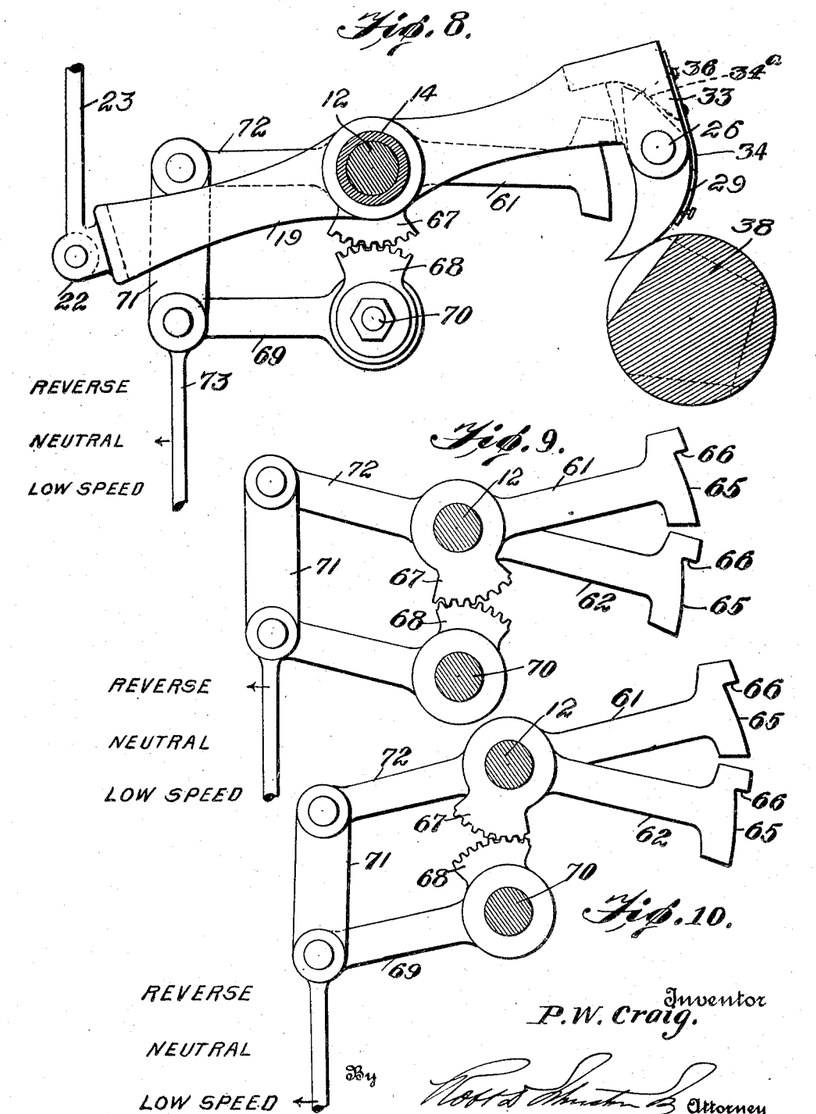
Fig. 8 is a view in section through the pawl setting cylinder, showing the master lever and its pawl in normal or "clutch engaged" position, the pawls being disengaged from their respective control levers.
Figs. 9 and 10 are diagrammatic views illustrating the different operating positions of a pair of coördinated control levers controlling two of the gear shifting operations.

As the master lever 19 is oscillated with each full clutch releasing stroke of the clutch pedal it advances the several pawls 29, 30, 31 and 32 toward the controller cylinder 38, i. e., moves them from their normal "clutch engaged" positions as illustrated in Fig. 8 to the position shown in Fig. 4. As the several pawls are thus advanced it will be seen that the surfaces 37 of all of these except the pawl 29 (Fig. 4) will contact with the periphery of the cylinder, whereas the pawl 29 under tension of its respective spring 34 will engage in its respective notch 46 and in doing so its tooth 36 will be free to snap against the surface 65 on the head of the lever 61 and assume operative position. The teeth 36 on the other three pawls will be held by their engagement with the true surface of the cylinder 38 away from their respective control lever heads and in what I term "inoperative" position. As the lever is allowed to move to clutch engaging position, the master lever 19 shifts from the position in Fig. 4 to the position in Fig. 8, and in doing so the pawl that has shifted into engagement with the lever 61 will strike the tooth 66 on the latter and carry it to the position shown in Fig. 9. This movement of the lever 61, acting through the gears 67 and 68, will move the shifting arm 69 rearwardly and thereby through the gear shift rod 73 will shift the gears to "reverse" position and at the same time through link 71 and arm 72 will move the control lever 62 as an idle element forward of its initial position. The next releasing movement of the clutch will again shift the master lever 19 from the position shown in Fig. 8 to that shown in Fig. 4, and in doing so its web 35 will pick up the retracted lever 61 and advance it to "neutral" position, and this movement through the gearing 67 and 68 and link 71 will draw back the lever 62 to its initial position. In the meantime however through the action of the gearing described, the controller cylinder will have advanced one step, and in doing so will present a notch 46 into position opposite the pawl 30.

Figure 11:
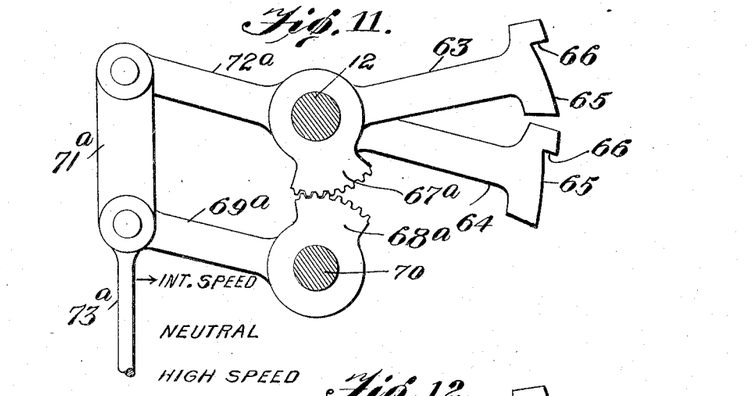
Figs. 11 and 12 are similar views of the other pair of coördinated control levers which control the other two gear shifting operations.
Figure 12:
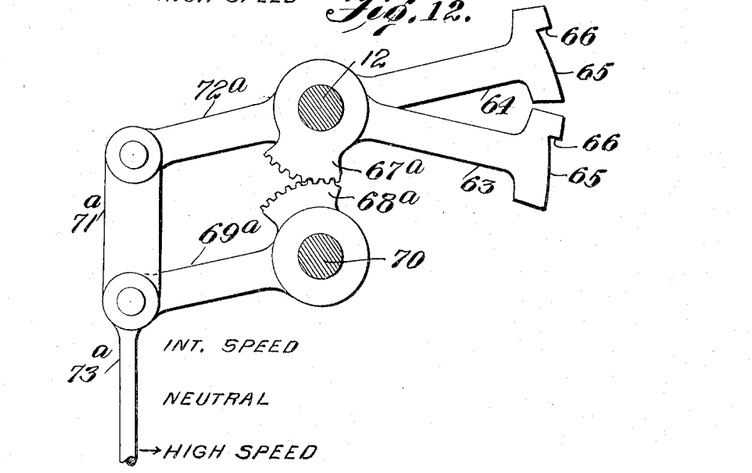

The next clutch engaging movement of the pedal will rock the master lever, causing the pawl 30 to pick up the lever 62 and move it to the position shown in Fig. 10, which through the instrumentalities described will shift the lever 61 forward and will move the shift rod 73 so as to change the gears from neutral to low speed. The next clutch releasing movement will shift the control levers to neutral position and present the cylinder in position with the notch opposite the pawl 63 which will cause the pawl 31, as it moves responsive to the next clutch engaging movement, to shift the levers 63 and 64 to the positions shown in Fig. 11, and by means of the gear shift rod 73ª to shift the gears to intermediate speed. The next clutch releasing movement will return all control levers to neutral position and present the controller cylinder with a notch opposite the pawl 32 so that the succeeding clutch engaging movement will cause this pawl to engage lever 64 and move it to reverse the position of levers 63 and 64 from the position in Fig. 11 to that shown in Fig. 12 and to shift the gears from intermediate to high speed. The next clutch releasing movement will return all control levers to neutral position and present the controller cylinder with its neutral zone in pawl engaging position where it will be seen that the rod 73 is shifted to position midway between the positions shown in Figs. 9 and 10, and in like manner the rod 73ª will be shifted midway between the positions shown in Figs. 11 and 12. The next clutch engaging movement of the master lever will not disturb the position of the control levers nor of the rods 73 and 73ª due to the fact that all of the pawls 29, 30, 31 and 32 are held out of lever engaging position by their engagement with the true surface of the cylinder or its neutral zone. The next clutch releasing movement will have no effect on the control levers and will advance the cylinder to the position shown in Fig. 8, and the succeeding clutch engaging movement will shift the gears to reverse and the cycle will be repeated unless while the gears were in neutral position the knob 43 was turned by hand to skip the reverse position and present the controller cylinder 38 in position to cause the shifting of the gears to low, intermediate or high speed position as may be desired with the next clutch engaging movement. It will be understood that the controller cylinder may be shifted at any time to any point in the cycle of operation to bring the transmission gearing into the desired mesh with the next clutch engaging movement, thus giving the apparatus as full freedom of manual control and as complete "selectivity" as exists in any mechanical gear shifting apparatus, but at the same time the transmission gears will automatically in the manner described respond to full clutch operations and follow through the normal sequence of gear shifting steps occuring in driving operations and therefore will greatly simplify the attention necessary for shifting the gears.

It should be especially noted that each operation of the clutch pedal to disengage it acts through the web 35 to engage and move the control levers and transmission gears into neutral position before the clutch engaging movement of the pedal effects the gear change and this clutch engaging movement being responsive to spring action will effect the shifting of the gears in the manner that will have the least possible tendency to strip or injure the gears, it being desirable that the teeth should be snapped into engagement with a quick positive movement for best results.

It will be understood that the detail construction of the master lever, the controller cam and the pawl operated control levers may be substantially varied without departure in principle from the substance of my invention, which is not limited to such detail construction but covers such changes as may properly come within the scope of the appended claims.

Having thus described my invention, what I claim as new and desire to secure by Letters Patent is:—

1. The combination with variable speed transmission gearing, of a plurality of gear shifting members, a master actuator for said members and its operating means, a selective transmission means between said actuator and members, a controller means for the selective means, and means to automatically shift said controller means with each operation of said actuator.

2. The combination with variable speed transmission gearing, of a plurality of gear shifting members, a master actuator for said members and its operating means, a selective transmission means between said actuator and members, a controller means for the selective means, means to automatically shift said controller means with each operation of said actuator, and means to shift the controller means independently of said automatic shifting means.

3. The combination with variable speed transmission gearing, of a plurality of gear shifting members, a master actuator for said members, means to operate said actuator by the clutch pedal, and a selective transmission means between said actuator and members, comprising as elements a controller means, and agencies, one automatic and the other selective, which jointly control the positioning of said controller means.

4. The combination with variable speed transmission gearing, of a plurality of gear shifting members, a master actuator for said members, means to operate said actuator by the clutch pedal, and a selective transmission means between said actuator and members, comprising as elements a controller means, and agencies, one pedal controlled and the other manual controlled for shifting said controller means.

5. The combination with variable speed transmission gearing, of a plurality of gear shifting members, a master actuator for said members and its operating means carrying pawls, a controller cam for said pawls adapted to position them one at a time in operative position to engage and move its respective gear shifting member, and clutch pedal controlled means to move the actuator and shift said controller cam step by step.

6. Multiple speed mechanism and a controller therefor including a speed change actuator, a selector automatically advanced step by step by said actuator, and means movable with the actuator and positively controlled by the relative position of the selector thereto, for effecting the speed change appropriate for the position of the selector.

7. Multiple speed mechanism and a controller therefor including a speed change actuator, a selector automatically advanced step by step by said actuator, means positively controlled by the selector, for effecting the speed change appropriate for the position of the selector, and manual means to supersede the automatic step by step positioning of said selector and set it for any desired speed change.

8. The combination with variable speed transmission gearing, and means for shifting the gearing, of an actuator, means automatically responsive to the movements of said actuator to shift said gearing through a predetermined sequence of different operating positions, and a hand control means to modify selectively the sequence of different operating positions of said gearing.

9. The combination with variable speed transmission gearing, of means for shifting the gearing comprising a master lever and means to reciprocate it, a plurality of pairs of operating levers, means coupling the units of each pair of operating levers to cause them to move in reverse directions from neutral position, a gear shifting element controlled by each pair of operating levers, means on the master lever as it moves in one direction to move all operating levers to neutral position, and cam controlled means on the master lever adapted as the latter moves in a reverse direction to engage and move a predetermined operating lever, as and for the purposes described.

10. In a gear shifting mechanism, pairs of operating levers, gear shifting elements controlled by each pair of levers, means coupling the units of each pair of levers to cause them to move in reverse directions from neutral position, a master lever adapted as it moves in one direction to shift all operating levers to neutral position, a pawl carried by the master lever for moving each operating lever, a controller cam for the pawls adapted to move them one at a time into operating position to engage and move its respective operating lever along with the movement of the master lever, and manual means to adjust the controller cam to bring the desired pawl into operating position.

11. In a gear shifting mechanism, pairs of operating levers, gear shifting elements controlled by said pairs of levers, means coupling the units of each pair of levers to cause them to move in reverse directions from neutral position, a master lever adapted as it moves in one direction to shift all operating levers to neutral position, a pawl carried by the master lever for each operating lever, a controller cam for the pawls adapted to move them one at a time into operating position, the pawl in operating position being adapted to engage and move its respective operating lever along with the return movement of the master lever, manual means to adjust the controller cam to bring the desired pawl into operating position, and yieldable set means to bring the controller cam to rest in one or the other of its operating positions.

12. In a gear shifting mechanism, the combination of a master lever and a plurality of gear shifting agents independently controllable thereby, of a rotatable controller cam having a plurality of cam faces equidistantly distributed about its periphery, means responsive to each of said surfaces which is adapted in response to a movement of the master lever to effect a predetermined shift of the gears, clutch pedal controlled means to rotate said cam step by step from one to another of its operating positions, and manual means to advance the cam to skip any desired number of steps, substantially as described.

13. In a gear shifting mechanism, a clutch pedal operated master lever, pawls carried by said lever, a controller cam for said pawls, means operable by the pawls when they assume operating position under control of said cam to shift the transmission gears, said master lever being adapted responsive to the clutch disengaging movement to present its pawls to the cam and on the clutch engaging movement of the pedal to shift the transmission gears by means of the pawl in operative position, and means responsive to the clutch engaging movement of the clutch pedal to shift the cam to a new operating position.

14. In a gear shifting mechanism, a clutch pedal operated master lever, pawls carried by said lever, a controller cam for said pawls, means operable by the pawls when they assume operating position under control of said cam to shift the transmission gears, said master lever being adapted responsive to the clutch disengaging movement to present its pawls to the cam and on the clutch engaging movement of the pedal to shift the transmission gears by the pawl set by the cam in operative position, means responsive to the clutch engaging movement of the clutch pedal to shift the controller cam to a new operating position, said means comprising a pawl and ratchet feed to the cam, and means to disengage the pawl and ratchet at the completion of each cam shifting operation.

15. In a gear shifting mechanism, a clutch pedal operated master lever, pawls carried by said lever, a controller cam for said pawls, means operable by the pawls when they assume operating position under control of said cam to shift the transmission gears, said master lever being adapted responsive to the clutch disengaging movement to present its pawls to the cam and on the clutch engaging movement of the pedal to shift the transmission gear by means of the pawl in operative position, means responsive to the clutch engaging movement of the clutch pedal to shift the cam to a new operating position, said means comprising a pawl and ratchet feed to the cam, means to disengage the pawl and ratchet at the completion of each cam shifting operation, a handle to shift the cam at will when the pawl and ratchet are disengaged, and yieldable means to bring the cam to rest in one or the other of its operating positions, substantially as described.

16. Multiple speed mechanism and controller means therefor including a selector for the various speed controls having a visible indicator, and a speed change actuator movable in one direction to engage and be set by said selector and in a reverse direction for effecting the speed control indicated by the selector and controlled by its setting.

In testimony whereof I affix my signature.

PARLEY W. CRAIG.

Witness:
NOMIE WELSH.